United States Patent Office 3,169,143
Patented Feb. 9, 1965

3,169,143
PREPARATION OF 2-AMINOETHYL HYDROGEN SULFATE
Gilbert Gavlin, Lincolnwood, and Kiyoshi Hattori, Chicago, Ill., assignors to The Richardson Company, Melrose Park, Ill., a corporation of Ohio
No Drawing. Filed Oct. 30, 1961, Ser. No. 148,717
1 Claim. (Cl. 260—458)

This invention relates to a method for the production of 2-aminoethyl hydrogen sulfate which, as an intermediate, is used in the production of ethylenimine finshing compositions for the paper and textile industries.

In present day practices, 2-aminoethyl hydrogen sulfate is produced by heating sulfuric acid and ethanolamine at elevated temperatures on the order of 250° C. In the well-known Wenker process, using an open-flame, charred organic residue of the ethanolamine is a very substantial problem along with sulfur dioxide fumes, both of which incidentally reflect reduced yields. More recently, ethanolamine and sulfuric acid have been combined by heating in the presence of o-dichlorobenzene, an inert high-boiling solvent, which prevents caking. Similarly, heating under vacuum has improved the condition of the product and the yield. However, it can be seen that all of these methods require high heat input and are quite expensive for that reason and for the reason that special equipment is required for reasonable yield.

Accordingly, it is an object of this invention to provide a method whereby ethylenimine can be produced at lower cost by means of a more efficient process for the production of 2-aminoethyl hydrogen sulfate.

This and related objects are achieved in the practice of this invention by the use of sulfur trioxide which in gaseous state reacts spontaneously with ethanolamine to produce in good yield 2-aminoethyl hydrogen sulfate readily converted into ethylenimine by treatment with hot, aqueous sodium hydroxide.

By the use of an entraining medium, such as circulating air or nitrogen, sulfur trioxide vapors can be moved into the reaction zone, it being necessary to bring the sulfur trioxide to a temperature only nominally above room temperature before substantial volumes of the vapor become available inasmuch as its boiling point is 113° F. With the reaction between sulfur trioxide and ethanolamine thus begun, its exothermic nature provides adequate heat to keep it progressing at a suitable rate.

Further details and description of the methods of this invention can be had from the following example:

Liquid $SO_3$ (32.0 g.) by mild heating was volatilized in the course of one-half hour and conveyed in a stream of nitrogen into a solution of freshly distilled ethanolamine (23.6 g.) in 250 ml. of chloroform. As the $SO_3$ was being added, a semi solid product precipitated from solution and after the addition of $SO_3$ was completed, the chloroform was refluxed for 1¾ hours during which time the precipitated product became hard. When exposed to air for a short time, this hard precipitate became soft and sticky, but after being heated for several hours in an oven at 120° C., the product, light tan in color, stayed unchanged on exposure to air. The crude yield was 52.0 g. for 95% of the theoretical. Crystallization of a 10 g. aliquot gave 8.8 g. of product (88% yield) verified by its infra-red spectrum as being 2-aminoethyl hydrogen sulfate.

In the foregoing example, the fact that the precipitated product became soft and sticky on exposure to air is an indication that sulfamation may have occurred initially yielding N-(B-hydroxyethyl) sulfamic acid which was rearranged to the sulfate by heating.

In the example, the exact times and temperatures referred to are only exemplifications of broader ranges that are operable. Only within very broad limits are these factors to receive consideration because there is essentially no criticality of reaction conditions. In warming the liquid sulfur trioxide, the only consideration is to produce sufficient gaseous sulfur trioxide to first initiate and then complete the reaction within a reasonable time period. Most feasibly, this can be accomplished in the broad range from room temperature to sulfur trioxide's boiling point of 113° F., but this range is only preferred and is not limiting. Similarly, converting the precipitate to a solid form of 2-aminoethyl hydrogen sulfate remaining unchanged on exposure to air involves only a time-temperature relationship rather than a particular set of conditions. At 80° C., the conversion could be expected to be consummated in possibly 20 hours, whereas the same end result would take place at 150° C. in possibly 3 hours.

Having thus defined our invention, we claim:

A process for making 2-aminoethyl hydrogen sulfate which comprises reacting gaseous sulfur trioxide with ethanolamine and heating the reaction product consisting of 2-aminoethyl hydrogen sulfate and N-(B-hydroxyethyl) sulfamic acid to convert said N-(B-hydroxyethyl) sulfamic acid to 2-aminoethyl hydrogen sulfate.

References Cited by the Examiner
UNITED STATES PATENTS

| | | | |
|---|---|---|---|
| 2,088,027 | 7/37 | Law et al. | 260—459 |
| 2,187,244 | 1/40 | Mills | 260—459 |
| 2,697,031 | 12/54 | Hervert | 260—459 X |
| 2,921,085 | 1/60 | Schramm | 260—458 |
| 2,923,728 | 2/60 | Falk et al. | 260—459 |
| 2,966,518 | 12/60 | Johnson | 260—548 X |
| 3,037,042 | 5/62 | Laemmle | 260—458 |
| 3,079,416 | 2/63 | Dupré et al. | 260—458 |

FOREIGN PATENTS 581,539  10/46  Great Britain.

OTHER REFERENCES

Audrieth: Chem. Rev., vol. 26, pages 70–71 (1940).
Breslow et al.: J.A.C.S., vol. 76, 5361–5363 (1956).
Groggins: "Unit Processes In Organic Synthesis," 5th ed., pp. 309–310 (1958).

CHARLES B. PARKER, *Primary Examiner.*

JOSEPH P. BRUST, *Examiner.*